United States Patent [19]

Klarer

[11] Patent Number: 6,104,988
[45] Date of Patent: Aug. 15, 2000

[54] ELECTRONIC CONTROL ASSEMBLY TESTING SYSTEM

[75] Inventor: John D. Klarer, St. Charles, Mo.

[73] Assignee: Automotive Electronics, Inc., St. Louis, Mo.

[21] Appl. No.: 09/141,076

[22] Filed: Aug. 27, 1998

[51] Int. Cl.$^7$ .......................... G06F 15/00; G01M 17/00
[52] U.S. Cl. ...................... 702/183; 702/184; 702/185; 701/29; 701/33; 701/35
[58] Field of Search .................................. 702/183, 184, 702/185, 182; 701/29, 32–35, 99, 116

[56] References Cited

U.S. PATENT DOCUMENTS

| | | |
|---|---|---|
| 4,404,639 | 9/1983 | McGuire et al. . |
| 4,757,463 | 7/1988 | Ballou et al. . |
| 4,831,560 | 5/1989 | Zaleski ...................................... 701/33 |
| 4,864,603 | 9/1989 | Battmann et al. . |
| 4,937,527 | 6/1990 | Sniegowski et al. . |
| 5,003,476 | 3/1991 | Abe . |
| 5,010,568 | 4/1991 | Merriam et al. . |
| 5,157,610 | 10/1992 | Asano et al. ............................... 701/33 |
| 5,172,062 | 12/1992 | Eisermann . |
| 5,177,447 | 1/1993 | Marino et al. . |
| 5,214,582 | 5/1993 | Gray . |
| 5,218,302 | 6/1993 | Loewe . |
| 5,229,942 | 7/1993 | Nicholson et al. . |
| 5,315,252 | 5/1994 | Puetz et al. . |
| 5,369,991 | 12/1994 | Armstrong . |
| 5,461,908 | 10/1995 | Armstrong et al. . |
| 5,530,360 | 6/1996 | Kerchaert et al. . |
| 5,541,840 | 7/1996 | Gume et al. ............................. 702/184 |
| 5,758,300 | 5/1998 | Abe ........................................... 701/35 |
| 5,899,947 | 5/1999 | Hall et al. ................................. 702/64 |

FOREIGN PATENT DOCUMENTS

| | | |
|---|---|---|
| 9851991 | 11/1998 | WIPO . |
| 9923451 | 5/1999 | WIPO . |
| 9923783 | 5/1999 | WIPO . |

OTHER PUBLICATIONS

Edge Diagnostic Systems, Engine–Tech, CH 101195 SPECSTS (no date) (4 pages).
Edge Diagnostic Systems, Diagnostic Software Module, Simu–Tech (no date) (4 pages).

*Primary Examiner*—Marc S. Hoff
*Assistant Examiner*—Bryan Bui
*Attorney, Agent, or Firm*—Polster, Lieder, Woodruff & Lucchesi, L.C.

[57] ABSTRACT

An automotive powertrain assembly testing system comprising an interface module adapted to interconnect between an electronic control module of an automotive vehicle and an on-site computer system capable of accessing a remote database and data interpretation system. The interface module includes a four channel signal input capable of sampling data at a rate of 500,000 samples per second, in the range of zero to 250 volts. The interface module further includes a sample buffer capable of storing 32,768 samples per input channel. Electronic samples received by the interface module are transferred via an electronic connection to the on-site computer system, for real-time display to a system operator, and for transfer via a standard phone line or high-speed data connection to a remote database and data interpretation system. The data interpretation system receives the sampled data, compares it with acceptable data values for the vehicle undergoing diagnosis, and generates a component evaluation report. The component evaluation report is transmitted back to the on-site computer system for display to the operator or technicians, and includes a listing of vehicle components generating signals which are outside acceptable ranges. The data interpretation system further indicates to the operator or technician a repair priority for the failed components to facilitate rapid repair of the automotive vehicle.

31 Claims, 10 Drawing Sheets

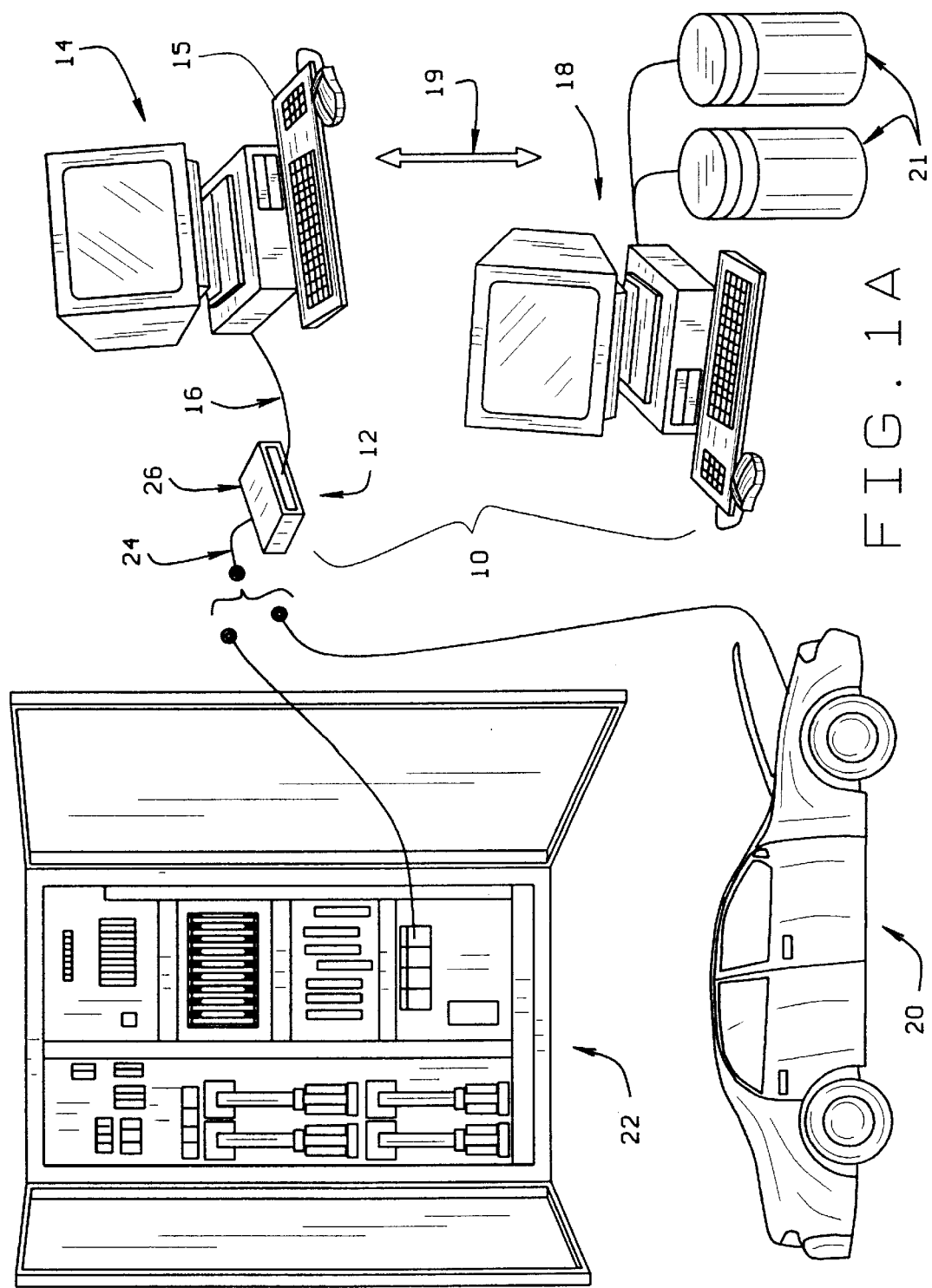

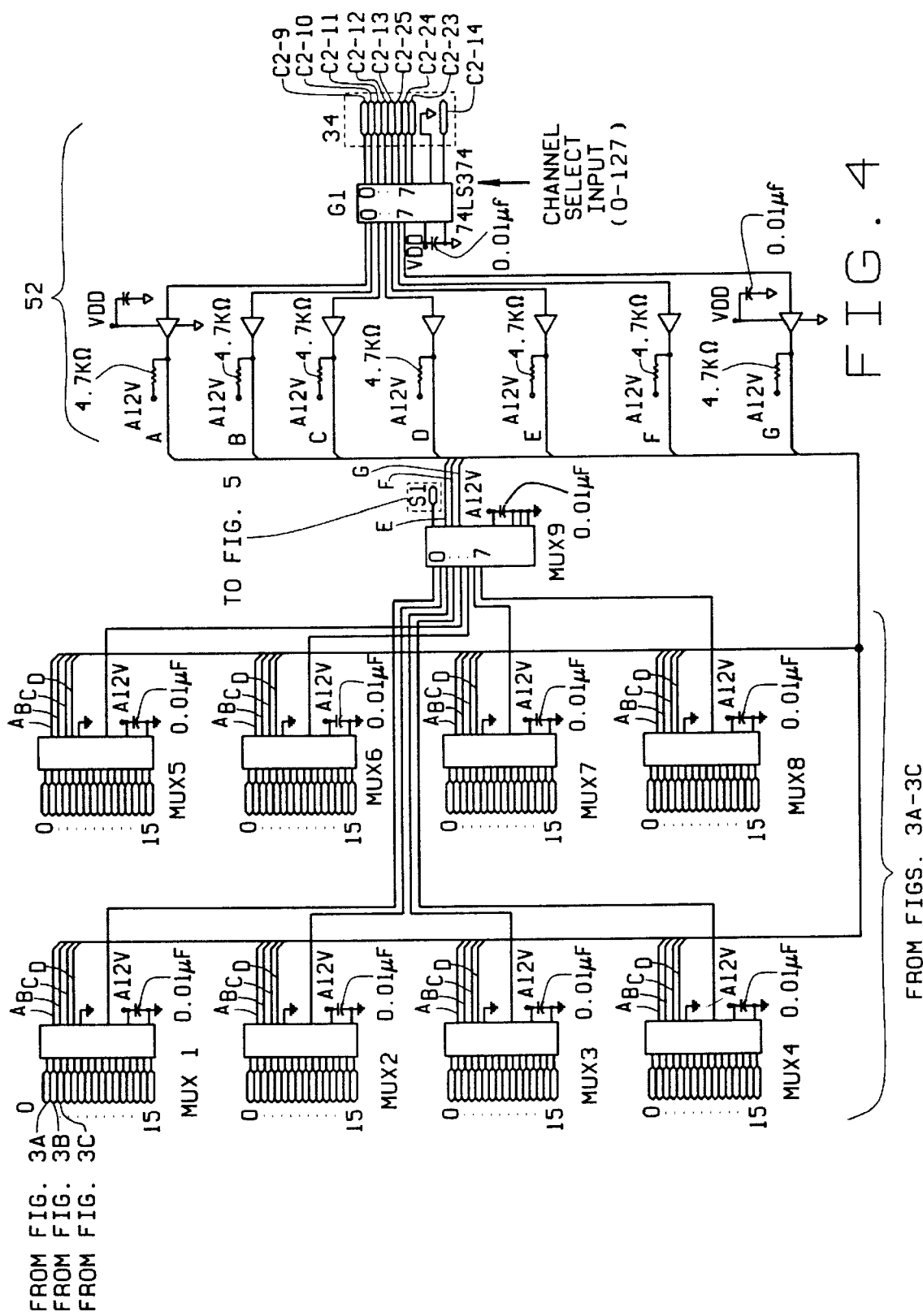

ELECTRONIC CONTROL ASSEMBLY TESTING SYSTEM

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to a device and method for diagnosing faults in an electronic control system, and more specifically, to a device for passively sampling, in real-time, the electronic signals exchanged between an electronic control module and electronic system components of a system undergoing diagnosis. The device of the present invention interacts with an associated database and computer system to identify and repair-order prioritize for a system operator, those electronic components which are not operating within predetermined parameters as determined from the sampled electronic signals.

Many modem devices, such as automotive vehicles, now include numerous complex electrical components and one or more associated electronic control modules for monitoring and regulating the various component operations. These components typically replace mechanical devices or regulators with electronically activated mechanisms or sensors which are capable of much more precise operation, leading, in the case of an automotive vehicle, to an increase in engine efficiency and an enhancement of vehicle safety features. For example, modern automotive vehicles now include computer controlled anti-lock braking systems, "smart" automatic transmissions, traction control systems, and even yaw control systems. Additional complex electronic components may also be found in engine management areas such as fuel injection systems, emissions control systems, and the continuous observation of numerous engine operating parameters Many of these complex electrical components and systems are interconnected between each other and to a centralized electronic control module or ECM. Hence, rather than having a simple wiring harness connecting individual components between a power source and an electrical ground, complex bundles of wires now interconnect components and the electronic control module. With this high degree of component interaction, the identification of malfunctioning components becomes much more difficult, as "troubleshooting" the vehicle electrical system becomes an increasingly difficult and time-consuming task. An electrical failure in one component can now affect the operation of numerous other components, leading technicians to incorrect diagnosis. For example, a grounding failure in the electronic control module itself can result in numerous other electrical components defaulting to a "high" state, giving the appearance of numerous component failures when, in reality, only the ECM has failed.

To facilitate diagnosis and repair of these electrical systems found in modern automotive vehicles and other complex devices such as pumping systems, refrigeration systems, and computer aided manufacturing systems, technicians commonly employ diagnostic devices or "break-out boxes" designed to interconnect between the system electronic control module and device wiring harness. These devices are then configured to supply test signals to individual system components or passively observe their operation, and to receive and display the resulting electrical signals to the repair technician, who must then interpret the results to determine if a particular component has failed. There are a number of drawbacks associated with utilizing current break-out boxes for electronic diagnosis. Due to the large number of vehicles or devices which a technician might service, the break-out box must be reconfigured for each different electronic system to which it is connected. The technician must then take time to determine the appropriate settings for the electronic system, and what signal ranges are considered acceptable for the received electrical signals. This often requires consulting a bound service volume, or the use of software running on a computer installed in the repair shop. Such software, while facilitating the task of the technician by supplying connection information and instructions on how to interpret the results, is static, i.e. it only contains information on the particular vehicles or devices which were on the market at the time the software was written. To remain current, the repair shop is required to continually receive updates to the software which contain the latest system electrical component parameters.

Accordingly, it would be advantageous to employ a passive diagnostic system capable of automatically configuring itself to the appropriate settings for a wide variety of vehicles or other systems employing complex electronics which may be tested, and which is also capable of interpreting data received from the electronic system. Furthermore, it would be beneficial if the diagnostic system was easy to use, and did not require periodic software updates to be purchased or installed by the operator.

BRIEF SUMMARY OF THE INVENTION

Among the several objects and advantages of the present invention are:

The provision of an electronic control assembly testing system including an interface module configured to interconnect between a system electronic control module and wiring harness for capturing electronic signals representative of the status of various system electrical components connected to the harness;

The provision of the aforementioned electronic assembly testing system wherein the device is configured for connection to an automotive vehicle powertrain electronic system and to capture electronic signals representative of the status of various vehicle electronic components;

The provision of the aforementioned testing system wherein said interface module is further configured to interconnect with a remote computer and database for the interpretation of captured electronic signals;

The provision of the aforementioned testing system including an on-site computer configured to receive signals from the interface module, the remote computer, and information input from a system operator;

The provision of the aforementioned testing system wherein the on-site computer is further configured to display an interpretation of the captured electronic signals received from the remote computer;

The provision of the aforementioned testing system wherein the remote computer is configured to receive and transmit data from and to multiple on-site computers simultaneously;

The provision of the aforementioned testing system wherein the interpreted electronic signals are displayed for the operator in a logical order facilitating the repair of the electronic system to which they testing system is connected;

The provision of the aforementioned testing system wherein the interpreted electronic signals are displayed for the operator together with a list of possible faulty system components, arranged in order of fault priority;

The provision of the aforementioned testing system wherein the interface module is configured to sample electronic signals from a system of electronic components at a rate of 500,000 samples per second;

The provision of the aforementioned testing system wherein the interface module include separate input channels capable of receiving simultaneous electronic signals from the system electronic components and evaluating the interaction between the signals;

The provision of the aforementioned testing system wherein the interface module is configured to receive electronic signals having an electrical potential ranging from zero to 250 volts; and The provision of the aforementioned testing system which is easy to use, rapidly identifies faulty electronic system components, and does not require regular software updates.

Briefly stated, the electronic control assembly testing system of the present invention comprises an interface module adapted to interconnect between an electronic control module of an electronic system such as is found in an automotive vehicle, and an on-site computer system capable of accessing a remote database and data interpretation system. The preferred embodiment of the interface module includes a four channel signal input capable of sampling data at a rate of 500,000 samples per second, in the range of zero to 250 volts. The interface module further includes a preferred sample buffer capable of storing 32,768 samples per input channel. Electronic samples received by the interface module are transferred via an electronic connection to the on-site computer system, for real-time display to a system operator, and for transfer via a standard phone line or high-speed data connection to a remote database and data interpretation system. The data interpretation system receives the sampled data, compares it with acceptable data values for the electronic system undergoing diagnosis, and generates a component evaluation report. The component evaluation report is transmitted to the on-site computer system for display to the operator or technicians, and includes a listing of system components displaying signals which are outside acceptable ranges. The data interpretation system further indicates to the operator or technician a repair priority for the failed components to facilitate rapid repair of the electronic system being tested.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1A is a simplified illustration of the electronic control assembly testing system of the present invention during use, connected to either an automotive vehicle or a refrigeration unit control system;

FIG. 4 is an electronic circuit diagram illustrating the input signal selector circuit for a single channel of the interface module;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what we presently believe is the best mode of carrying out the invention.

The terms "electronic control module" and "ECM" are interchangeably used in this application to broadly include any computer which performs system control functions over a variety of remotely disposed electronic components, whether through a single processor circuit or otherwise. Similarly, the term "pin" is used broadly to indicate any style of electrical connector.

Figure 1B:
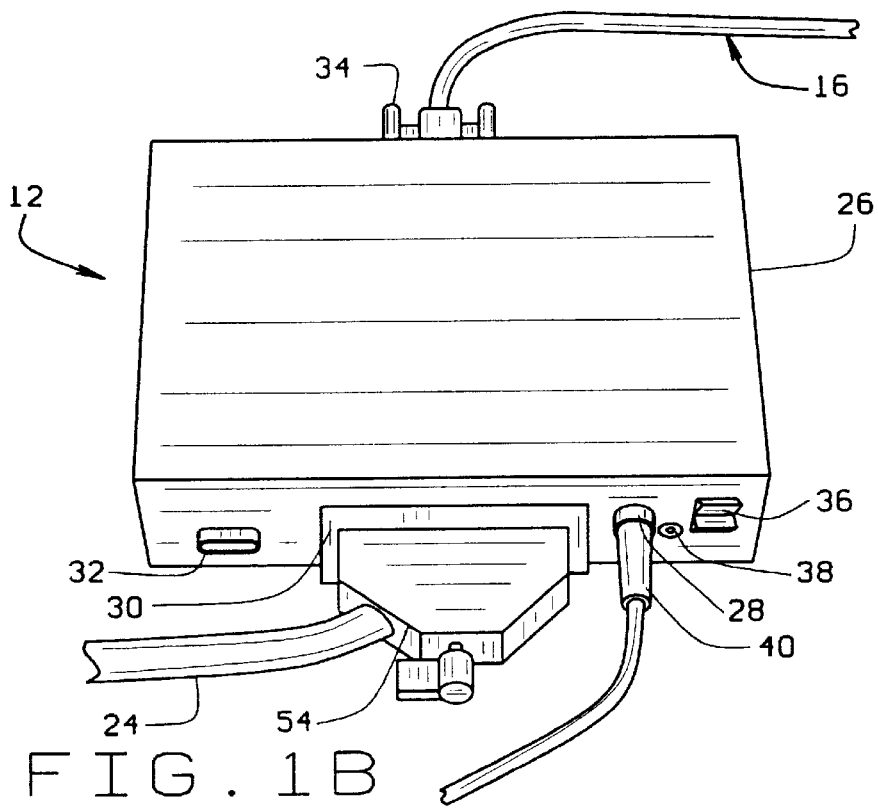
FIG. 1B is a perspective illustration of the interface module of the present invention.
Figure 3A:
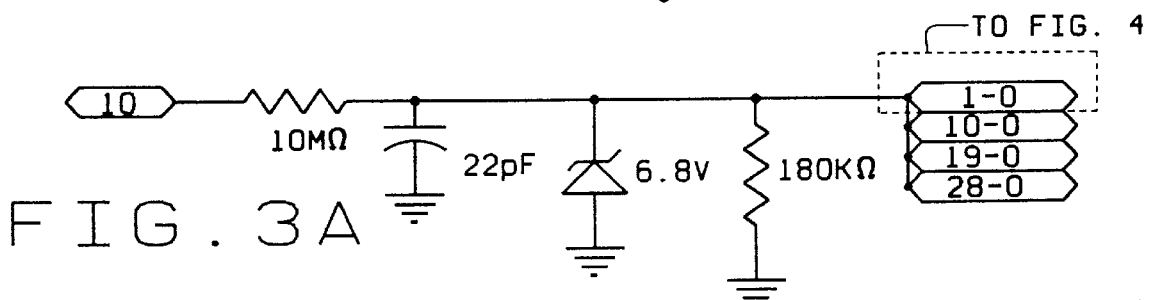
FIGS. 3A–3C are electronic circuit diagrams illustrating signal inputs to the interface module.
Figure 3B:
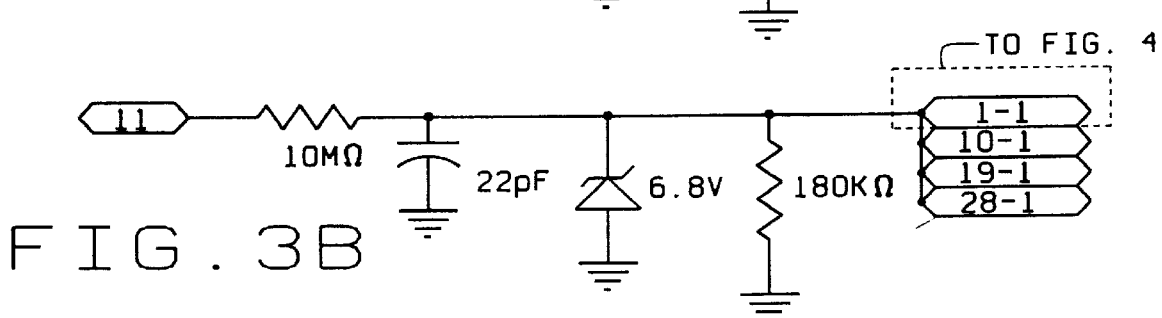
Figure 3C:
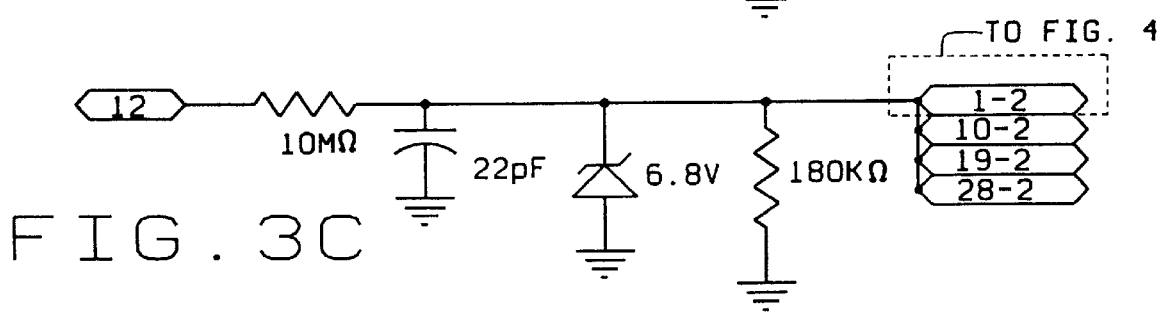

Turning now to FIG. 1A, the electronic control assembly testing system of the present invention is shown generally at 10. The testing system comprises an interface module 12 (FIG. 1B), an on-site or local computer 14 interconnected to interface module 12 through an electrical cable 16, and a remote computer 18 including an associated device database 21, which may be electronically linked to local computer 14 as required via a high-speed data connection 19. Additionally shown in FIG. 1A are two exemplary electronic systems, an automotive vehicle 20, and an industrial refrigeration unit 22, to which interface module 12 may be interconnected during use, through a wiring harness or "T-connector" 24.

The interface module is contained within a housing 26, preferably formed from a durable material such as a thick plastic or metal. The housing includes four external connectors, an electrical power receptacle 28, an adapter harness connector 30, preferably having 128 pins, a secondary adapter connector 32, and a bi-directional parallel connector 34. Adjacent the electrical power receptacle is an on-off switch 36 and a power indicator 38, preferably a colored light emitting diode (LED) for indicating when the interface module is turned on via switch 36. Electrical power is supplied to the interface module via a power cord 40 interconnected between a remote power source, preferably a standard 12 volt automotive-type battery and receptacle 28.

Figure 2:
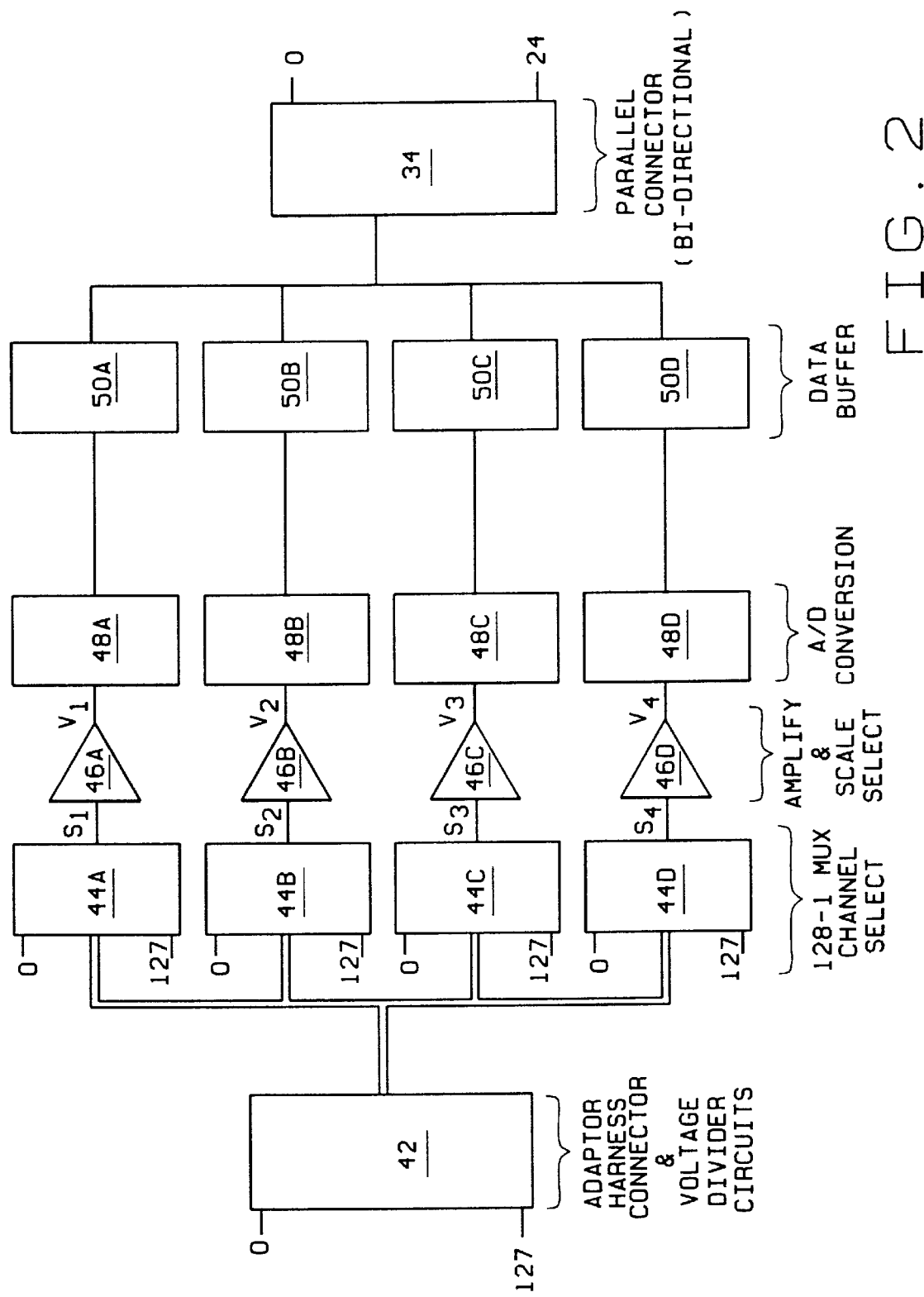
FIG. 2 is a block diagram illustrating the electronic components of each channel of the interface module for the electronic control assembly testing system.

Turning to FIG. 2, the internal circuitry of interface module 12 is shown in block form. Analog electronic signals are received at the 128 individual pins of adapter harness connector 30, and are each routed through a protective voltage divider circuit 42 to a bank of four 128-1 multiplexers 44A–44D such that four of the electronic signals received at connector 30 are selected and routed onto four separate channels. The four analog output signals from the multiplexers are routed through separate amplification and scaling circuits 46A–46D, and converted from analog to 8-bit digital format in corresponding A/D converters 48A–48D. Each of the resulting four digital signals is then routed to an associated data buffer 50A–50D, and to the bi-directional parallel connector 34 for transmission to local computer 14.

FIGS. 3A through FIG. 6 illustrate circuit diagrams for a preferred embodiment of the interface module 12. Signals received at each of the 128 individual input pins of the adapter harness connector 30 are routed through identical voltage divider circuits, three of which are shown for input pins 1–3 in FIGS. 3A–3C. The voltage divider circuits for each of the remaining input pins Nos. 4–128 are identical to those shown in FIGS. 3A–3C. As will be readily apparent to one skilled in the art, the circuits shown in FIGS. 3A–3C serve to protect the interface module by limiting the voltage level of any received input signals, preventing burn-out or damage. The resulting reduced input signals from each input pin are then routed to matching input pins on each of the four 128-1 multiplexer circuits 44A–44D. For example, signals from input pin No. 1 of adapter harness connector 30 are routed to the No. 0 input pins on each of the four 128-1 multiplexer circuits. Correspondingly, signals from input pin No. 128 of the adapter harness connector 30 are routed to the No. 127 input pins on the multiplexer circuits.

Turning to FIG. 4, the circuit layout of multiplexer circuit 44A is shown in detail. The circuit layouts of the remaining multiplexer circuits 44B–44D are identical to that of 44A, and hence will not be described in detail. Multiplexer circuit 44A consists of eight 16-1 multiplexers, Mux1–Mux8, each receiving reduced voltage input signals from sixteen consecutive pins of the 128 pins on the adapter harness connector. The output from each of the 16-1 multiplexers Mux1–Mux8 is routed to an 8-1 multiplexer Mux9, the output of which yields the final channel output S1 of the multiplexer circuit 44A. Channel outputs S2–S4 of multiplexer circuits 44B–44D are produced in the same manner.

The selection of which signal received at the 128 pins of the adapter harness connector will be directed to S1 is controlled through a channel select input circuit indicated generally at 52 in FIG. 4. The channel select input circuit is connected to bi-directional parallel port 34, and upon receipt of an appropriate control signal at gate circuit GI through pin C2-14 of port 34, binary data, indicated as A-D, on pins C2-9 through C2-12 of port 34 is read as an indication of which of the sixteen channels on each multiplexer Mux1–Mux8 is to be transferred to Mux9. The binary data, indicated as E-G, on pins C2-12, C2-23, and C2-24 is additionally read as an indication of which of the eight signals transferred to Mux9 is to be transferred to the final channel output S1. Accordingly, the selection of which signal from the 128 pins of the adapter harness 30 is to be transferred to output channel S1 is accomplished in two stages, first by a reduction from 128 to eight possible signal choices, then from eight down to one. Those skilled in the art will recognize that alternative methods for selecting one signal out of 128 possible input signals for direction to the output channel S1 may be employed within the scope of this invention.

Additionally, those skilled in the art will further recognize that the present invention may be readily adapted to utilize an adapter harness 30 having more than 128 pins by including additional multiplexer circuits. For example, a 256-pin adapter harness might be utilized in conjunction with channels employing sixteen separate 16-1 multiplexers (replacing Mux1–Mux8) with their corresponding outputs directed to a single 16-1 multiplexer (replacing Mux9).

Figure 5:
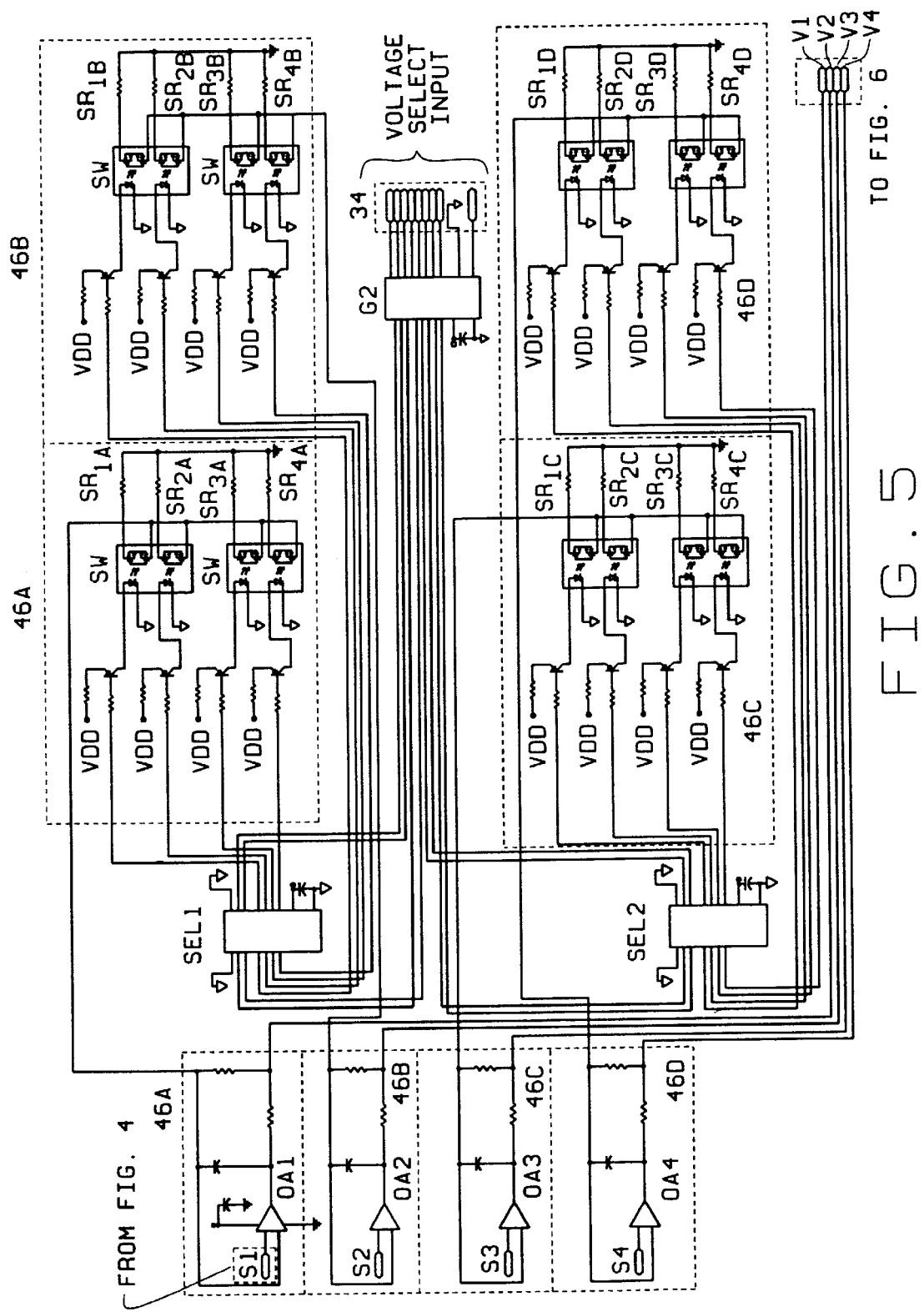
FIG. 5 is an electronic circuit diagram illustrating the amplification and signal voltage-range selector circuits for the interface module.
Figure 5A:
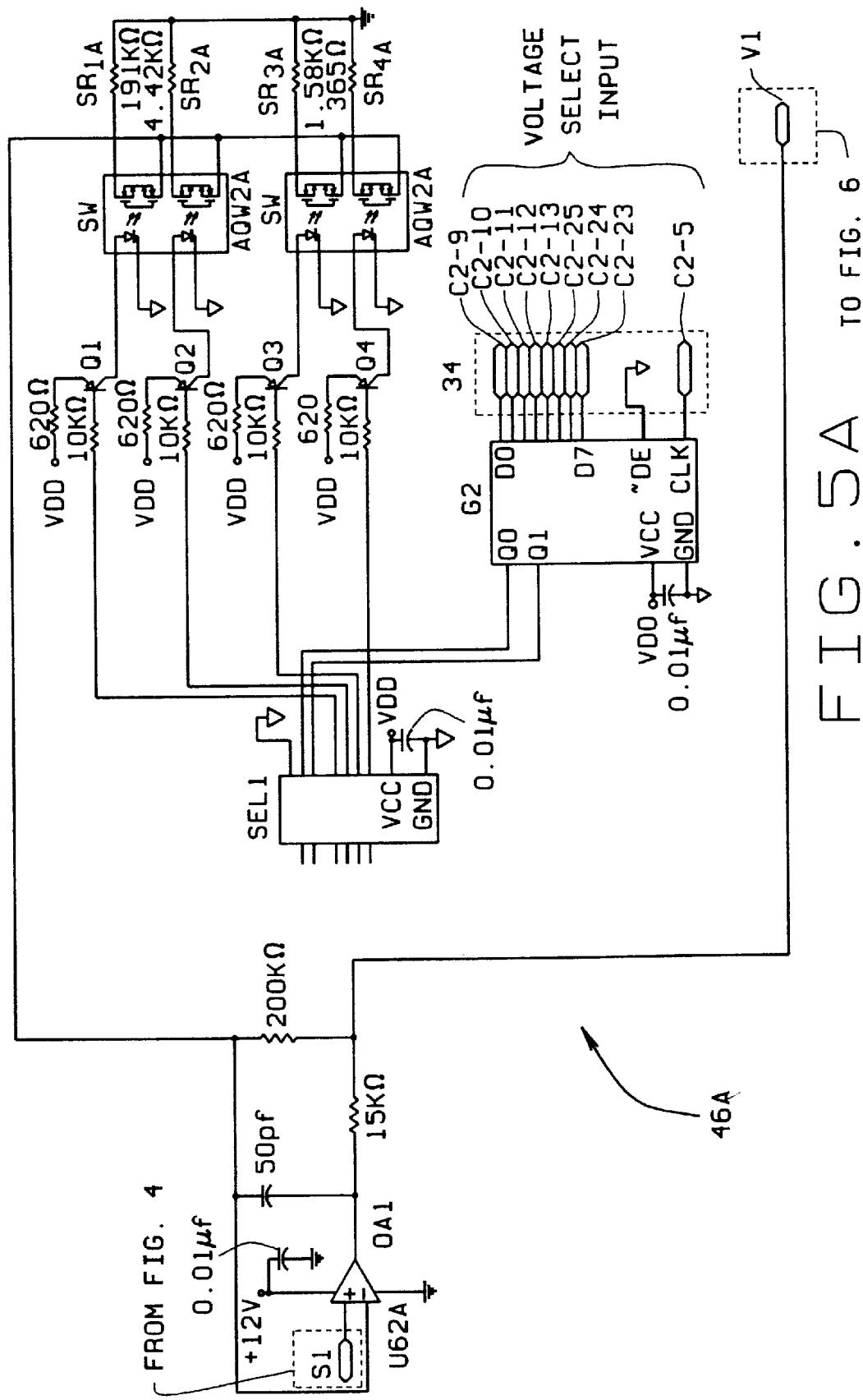
FIG. 5A is a view of the electronic circuits comprising one channel of the amplification and signal voltage-range selector circuits of FIG. 5.

Once individual signals are selected for each output channel S1–S4 from multiplexer circuits 44A–44C, each signal is amplified to within a selected voltage range by the amplification and scaling circuits 46A–46D, illustrated in FIGS. 5 and 5A. As each of the four amplification and scaling circuits 46A–46D are identical, only the components and operation of circuit 46A will be described in detail.

The voltage range within which the signal on output channel S1 is to be amplified to is selected by a pair of binary signals received at selector circuit SEL1 from pins C2-9 and C2-10 of bi-directional parallel connector 34. Binary signals received at selector SEL1 from pins C2-11 and C2-12 regulate output channel S2. Similarly, pairs of binary signals from pins C2-13, C2-25 and C2-24, C2-23 routed to selector circuit SEL2 regulate output channels S3 and S4 respectively. The binary signals from connector 34 are directed to the appropriate selector circuits upon receipt of a clock signal on connector C2-5 at gate circuit G2. The binary signals received at selector SEL1 which regulate output channel S1 direct the selection of one of four resistors SR1A–SR4A for connection to low-offset op-amp OA1 with output channel S1. Each resistor is connected to the op-amp through an circuit pathway containing an electro-optical switch SW. Normally open, switch SW closes the circuit pathway between a resistor and the op-amp upon activation of the corresponding LED selected by selector SEL1 and the received binary signals. Each of the resistors SR1A–SR4A has a different electrical resistance, chosen to regulate the voltage range within which signals on output channel S1 are amplified. Those skilled in the art will recognize that the selection of resistances for the resistors will vary depending upon the ranges within which signal amplification is desired.

Figure 6:
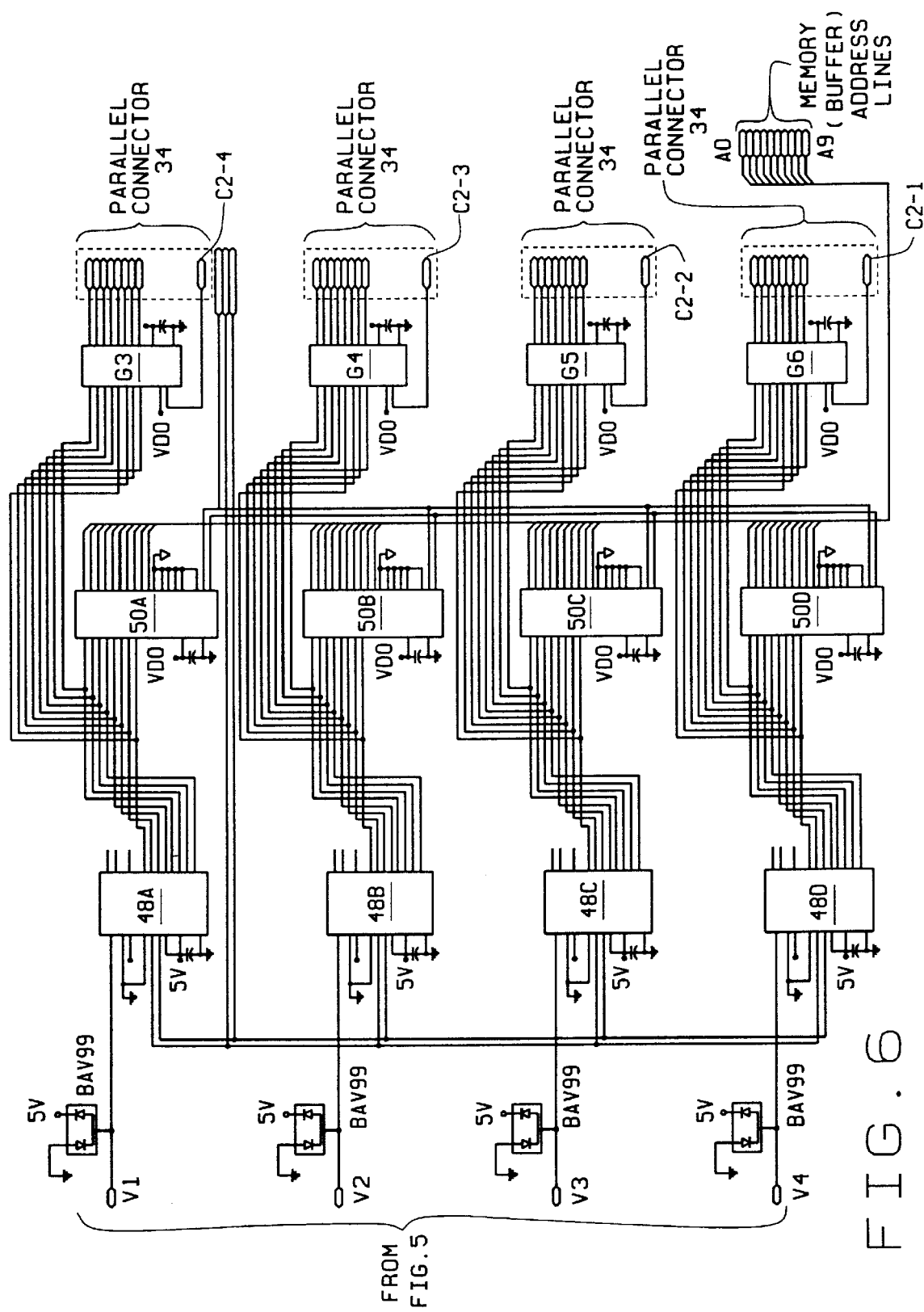
FIG. 6 is an electronic circuit diagram illustrating the analog to digital and data buffering circuits for the interface module.
Figure 6A:
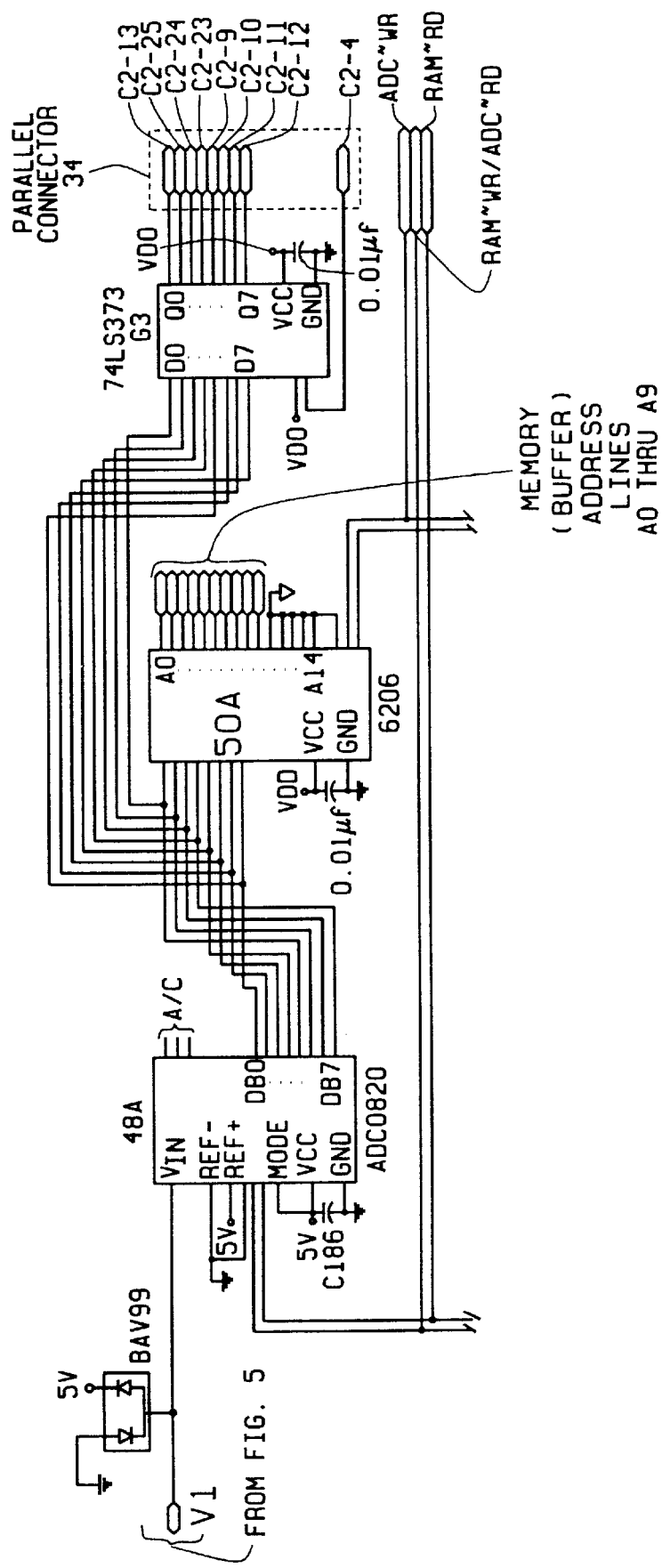
FIG. 6A is a view of the electronic circuits comprising one channel of the analog to digital and data buffering circuits of FIG. 6.

As shown in FIGS. 5 and 6, once amplified to the selected voltage range, signals from output channels S1–S4 are routed to the analog to digital converters 48A–48D and data buffers 50A–50D along output lines V1–V4. Each analog signal is converted from analog format to an 8-bit digital format by the A/D converters 48A–48D, and stored in corresponding digital data buffers 50A–50D. Each data buffer is additionally connected to the bi-directional parallel port 34 through a respective gate circuit G3–G6, which regulates the flow of digital information from the data buffers to the parallel port in response to signals received on port pins C2-1, C2-2, C2-3, and C2-4 respectively. As shown in FIGS. 6 and 6A, each data buffer 50a–50d is capable of storing 512 bytes of digital information, however, the preferred embodiment of interface module 12 employs data buffers capable of storing 32,768 bytes of information each. Those skilled in the art will recognize that larger data buffers may be incorporated within the interface module within the scope of this invention.

Figure 7:
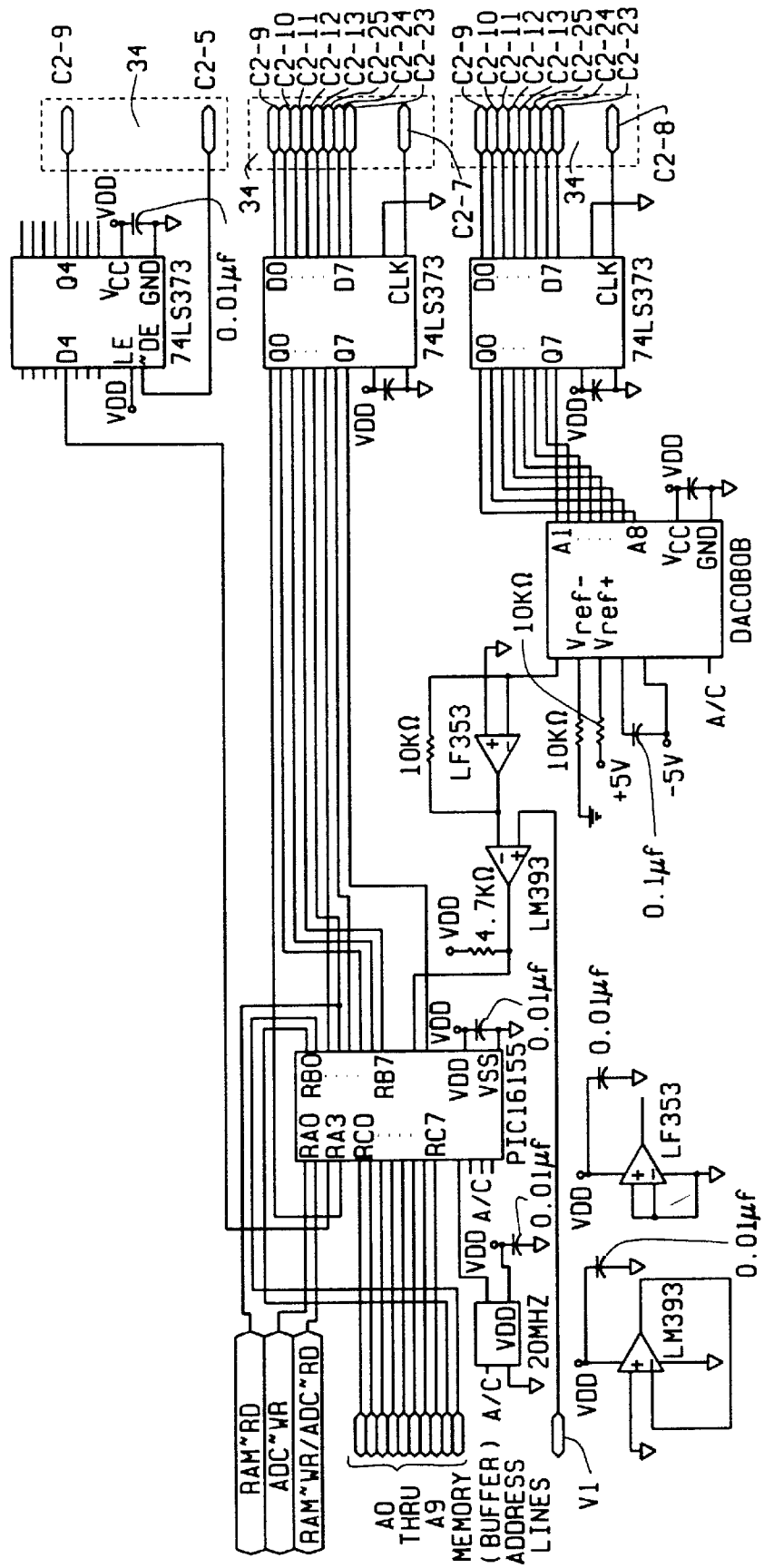
FIG. 7 is an electronic circuit diagram illustrating the data buffer addressing circuits.

An exemplary electronic circuitry shown in FIG. 7 illustrates the electronic circuits employed to control the address lines A0–A9 of each data buffer 50A–50D. Processor P1 controls the address lines A0–A9, responsive to signals received at the bi-directional parallel port 34, such that the digital signals received from output channels S1–S4 are stored in sequential memory locations within each data buffer 50A–50D, and are retrieved from the buffers as required by gate circuits G3–G6 in the proper sequence.

Figure 8:
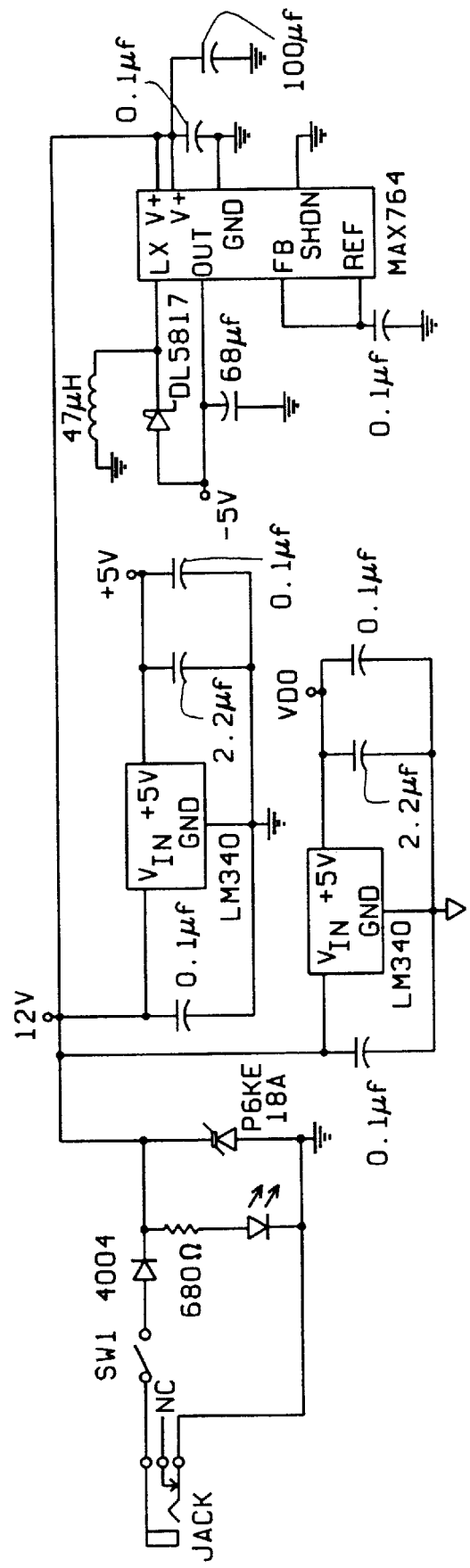
FIG. 8 is an electronic circuit diagram illustrating the power-supply circuits.

Turning now to FIG. 8, an exemplary electronic circuit for receiving and distributing electrical power to the remaining components of the electronic control assembly testing system 10 is shown. Grounded electrical power, preferably 12 volt DC such as from an automotive battery, is received at jack 28 and routed through switch 36 to the power distribution circuits 52. The power distribution circuits provide 12 volt power, ±5 volt power, and the VDO and ground connections for the remaining components of the electronic control assembly testing system 10.

Having set forth the electronic circuits which comprise the interface module, a method of use for the interface module and the other components of electronic control assembly testing system 10 will now be described. During operation of the electronic control assembly testing system 10, the interface module is supplied with power at connector 28 (FIG. 8). This power supply may be either an independent battery, or may be supplied directly from the power source of the electronic system undergoing testing. The testing system 10 is then interconnected to the electronic system undergoing testing, such as at 20 or 22 (FIG. 1A) through the adapter harness connector and the wiring harness or "T-connector" 24. The wiring harness includes an adapter plug 54 at one end configured to interface with adapter harness connector 34, and a pass-through plug or "T-connector" (not shown) at the opposite end designed to interconnect between an electronic control module and wiring harness of the system undergoing testing.

The testing system may now either be utilized to observe and store, in the data buffers 50a–50d, electronic signals received through the wiring harness for future analysis, or may be connected to a local computer 14 configured with appropriate software as described below, through the bi-directional parallel port for real-time analysis of the received signals.

To begin a test sequence, a system operator inputs a code identifying the system undergoing testing, and any specific features of the system, to the local computer through a keyboard 15 or other standard input device. The local computer establishes data link 19 to remote computer 18, either through a standard telephone line, high-speed data network, or dedicated Internet connection, and transfers the identifying code to the remote computer. This code is interpreted, and the resulting description of the system undergoing testing is transferred back to the local computer and displayed for operator confirmation. If there is a discrepancy between the displayed information and the system undergoing testing, the operator may input additional information as required.

Once the system undergoing testing has been properly identified to the remote computer, the testing procedures are started. The remote computer transfers information to the local computer instructing the system operator to perform a variety of actions on the system undergoing testing so that the interface module may collect data. These actions may include starting an engine or cycling through a sequence of operating steps, and are dependent upon the type of system being tested. During each action, the interface module receives data from the various components of the system through the pass-through plug or "T-connector", and transfers the data to the local computer through the bi-directional parallel connector. The data is subsequently transferred from the local computer to the remote computer, where it is compared against stored parameters representative of acceptable values for the system undergoing testing.

Once the signal data is received at the remote computer, those signals which fall outside of acceptable ranges are identified and prioritized as to possible causes of component failure. The results are returned to the local computer for display to the operator or technician. For example, when testing an automotive vehicle, the remote computer database contains information indicating which vehicle system components are dependent upon signals received from other system components. Accordingly, in prioritizing any detected component failures during a vehicle test, the remote computer identifies those failed components upon which other failed components depend, as having a higher repair priority. As such, a technician repairing the automobile is quickly directed to the most likely source of all of the vehicle problems.

In an alternative embodiment of the invention, rather than transferring signal data from the local computer to the remote computer for processing, the stored parameters representative of acceptable values for the system undergoing testing are transferred from the remote computer to the local computer. The local computer is further configured with software to perform the necessary data comparisons and prioritization of failed components.

By storing the ranges of acceptable parameters and the specifications of the system undergoing testing at the remote computer, individual system operators are no longer required to continually purchase software upgrades or new product databases to install on the local computer. Rather, the remote computer serves as a centralized location for the storage of such information, relieving individual operators from upgrade requirements. Each operator is only required to install and maintain the local computer interface software for connection to the remote computer.

Occasionally, the remote computer will not contain stored parameters representative of the acceptable values for the system undergoing testing. This may be due to an unavailability of parameters for the system undergoing testing due to an uncommon nature of the system or in the case of a new product not yet included in the remote computer databases. In such situations, the remote computer may be configured to record the signal data received from the local computer and categorize the data as "unverified" or "observed" data. This data may then be stored for future reference along with comments from a technician describing the system undergoing testing. For example, "Engine operating parameters observed on 1987 Peugeot with faulty AC system." While not considered 100% reliable, this data may be utilized in the event a second system of the same type undergoes testing. In such a case, the remote computer would indicate to the operator of the local computer that factory or manufacturer's specifications are not on-file, but that shop-observed data are stored in the database, and may be utilized for reference purposes if desired. In this manner, the remote computer database is adaptable in nature, and not rigidly restricted to only testing systems for which it has been programmed.

An additional feature of the electronic control assembly testing system is the ability of the interface module to simultaneously observe separate input signals, preferably four, received at the adapter harness connector. This permits the system operator to select, via the local computer, four separate signals received from components of the system undergoing testing, and observe in real-time the activity of the signals and the dependency of one signal upon another. For example, when diagnosing an automotive vehicle fuel system, the technician may desire to observe signals received from a fuel pump, and air mass meter, and two fuel injectors. This allows the technician to observe how a failure in one component is affecting other components of the system undergoing testing.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for diagnosing multiple components of an electrical control assembly, the assembly comprising an electronic control module and a plurality of electrical components electrically connected to the electronic control module by a wiring harness, comprising the steps of:

connecting an interface module between the electronic control assembly and a local computer, the interface module configured to receive electronic signals from said control module and said electrical components;

sending from the local computer to a remote computer, an identification code identifying the electronic control assembly undergoing diagnosis;

sending from the remote computer to the local computer information specific to the electronic control assembly;

operating the electronic control assembly undergoing diagnosis, said interface module receiving a plurality of individual signals from said electronic control assembly and transmitting said signals, through said local computer to said remote computer;

interpreting said plurality of individual signals at said remote computer; and receiving at said local computer, a display of data from said remote computer responsive to said received plurality of individual signals, said display including a prioritized listing of electronic components which are not operating within predetermined specifications.

2. The method of claim 1 wherein connecting said interface module between the electronic control assembly and a local computer comprises the steps of:

disconnecting said wiring harness from said electronic control module;

connecting a first end of a cable including a pass-through connector between said disconnected wiring harness and said electronic control module, a first side of said connector at said first end connected to said wiring harness, and a second side of said connector connected to said electronic control module;

connecting a second end of said cable to an input port of said interface module;

connecting a first end of a bi-directional data transfer cable to a bi-directional port on said interface module;

connecting a second end of said transfer cable to a port on said local computer; and supplying electrical power to said interface module.

3. The method of claim 1 further comprising the step of establishing a data transfer connection between said local computer and said remote computer prior to sending from said local computer to said remote computer, said identification code identifying the electronic control assembly undergoing diagnosis.

4. The method of claim 3 wherein sending from a local computer to a remote computer, an identification code identifying the electronic control assembly undergoing diagnosis further includes inputting said identification code into said local computer;

inputting one or more descriptive items into said local computer; and transmitting said identification code and descriptive items to said remote computer via said data transfer connection.

5. The method of claim 3 wherein sending from the remote computer to the local computer information specific to the electronic control assembly includes:

extracting descriptive information from an electronic database interconnected to said remote computer, said descriptive information associated with said received identification code; and transmitting said extracted descriptive information to said local computer via said data transfer connection.

6. The method of claim 1 wherein interpretation of said plurality of received individual signals from said electronic control assembly by said remote computer includes the steps of:

associating each of said received individual signals with an electronic component;

identifying a predetermined range of acceptable parameters for each electronic component from said electronic database, said acceptable parameters indexed by the type of said electrical control assembly;

comparing each of said received individual signals with said identified predetermined ranges associated with said electronic components; and identifying those received individual signals which fall outside said identified predetermined ranges.

7. The method of claim 6 wherein interpretation of said plurality of received signals further includes the steps of:

identifying failed electronic components associated with received signals falling outside acceptable ranges; and logically ordering said identified failed electronic components in order of repair priority.

8. The method of claim 7 wherein said order of repair priority is assigned by evaluating said database information on each failed electronic component to determine the number of said remaining failed electronic components which are interdependent thereupon during normal operation of said electronic control assembly.

9. The method of claim 1 further including the step of selecting a plurality of said received electronic signals for display on said local computer.

10. A diagnostic system for coupling to a wiring harness between an electronic control module and a plurality of electrical components of an electrical system to remotely diagnose said electrical system, comprising:

a local computer;

an interface module interconnected between said wiring harness and said local computer, said interface module having a harness connector having a plurality of pins for coupling to said wiring harness between said electronic control module and said plurality of electrical components, at least one output channel electrically coupled to said plurality of pins, said output channel including (a) a multiplexer having an input and an output, said input of said multiplexer coupled to said harness connector for selecting signals received from one of said plurality of pins, (b) a separate voltage limiting circuit electrically connected between each of said pins and said input of multiplexer to limit the voltage level of said received signals, (c) a voltage amplification and range selection circuit coupled to said output of said multiplexer, an output of said voltage amplification and range selection circuit directed to an output of said channel, and a sensor coupled to an output of said output channel, said sensor monitoring the voltage level of said signal received from said selected pin, said voltage level representative of a signal exchanged between said electronic control module and one of said plurality of electrical components of said electrical system; and said local computer configured to receive signals from said output channel to identify a prioritized listing of electronic components which are not operating within a predetermined specifications.

11. The diagnostic system of claim 10 wherein said harness connector of said interface module includes a "T" connector for extracting signals exchanged between said electronic control module and said plurality of electrical components over said wiring harness.

12. The diagnostic system of claim 11 wherein said harness connector of said interface module includes one hundred twenty eight coupling pins, each pin corresponding to a separate wire comprising said wiring harness.

13. The diagnostic system of claim 12 wherein said interface module includes four output channels coupled to said plurality of pins through a plurality of miltiplexers.

14. The diagnostic system of claim 11 wherein said harness connector of said interface module includes fifteen coupling pins, each pin corresponding to a separate wire comprising said wiring harness.

15. The diagnostic system of claim 12 wherein said at least one output channel of said interface module further includes an analog to digital converter circuit coupled to the output of said amplification and scaling circuit, said analog to digital converter circuit converting said signal from analog to digital format.

16. The diagnostic system of claim 15 wherein said digital format is an eight-bit digital format.

17. The diagnostic system of claim 10 wherein said voltage amplification and range selection circuit includes a low offset operational amplifier and a plurality of voltage range selection resistors, one of said voltage range selection resistors switchably connected to said operation amplifier to provide predetermined voltage amplification of said signal.

18. The diagnostic system of claim 17 wherein said predetermined voltage amplification ranges between 0 and 250 volts.

19. The diagnostic system of claim 10 wherein each of said separate voltage divider circuits is connected to an electrical ground point to scale-down said signals received at said pin.

20. The diagnostic system of claim 10 wherein said output channel operates at a 500 KHz sample frequency.

21. The diagnostic system of claim 10 wherein said signals received from said pins are voltage-level signals.

22. An interface module for interconnection between a wiring harness and a local computer configured with diagnostic software in a diagnostic system capable of being coupled to said wiring harness between an electronic control module and a plurality of electrical components of an electrical system for remotely diagnosing said electrical system comprising:

a harness connector having one hundred twenty eight coupling pins, each pin corresponding to a separate wire comprising said wiring harness for coupling to said wiring harness between said electronic control module and said plurality of electrical components, said harness connector includes a "T" connector for extracting signals exchanged between said electronic control module and said plurality of electrical components over said wiring harness;

at least one output channel electrically coupled to said plurality of pins, said output channel including (a) a multiplexer coupled to said harness connector for selecting signals received from one of said plurality of pins, (b) a separate voltage divider circuit electrically connected between each of said pins and said multiplexer, (c) an amplification and range selection circuit coupled to an output of said multiplexer, (d) an output of said amplification and range selection circuit directed to an output of said channel, (e) an analog to digital converter circuit coupled to the output of said amplification and scaling circuit, said analog to digital converter circuit converting said signal from analog to digital format, said output channel further includes a digital data buffer circuit coupled to the output of said analog to digital converter, said digital data buffer temporarily storing sequential digital signals prior to routing said signals to said output of said channel; and a sensor coupled to an output of said output channel, said sensor monitoring the voltage level of said signal received from said selected pin, said voltage level representative of a signal exchanged between said electronic control module and one of said plurality of electrical components of said electrical system.

23. The interface module of claim 22 wherein said digital data buffer has a storage capacity of thirty two thousand bytes of digital data.

24. A method for diagnosing multiple components of an electrical control assembly, the assembly comprising an electronic control module and a plurality of electrical components electrically connected to the electronic control module by a wiring harness, comprising the steps connecting an interface module between the electronic control assembly and a local computer, the interface module configured to receive electronic signals from said control module and said electrical components;

sending from the local computer to a remote computer, an identification code identifying the electronic control assembly undergoing diagnosis;

sending from the remote computer to the local computer information specific to said electronic control assembly;

operating the electronic control assembly undergoing diagnosis, said interface module receiving a plurality of individual signals from said electronic control assembly;

utilizing said information specific to said electronic control assembly and said received plurality of individual signals to identify components of said electronic control assembly which are not operating within predetermined specifications; and displaying at said local computer a prioritized list of corrective measures derived from said information specific to said electronic control assembly and said plurality of individual signals.

25. The method of claim 24 further including:

transferring said received plurality of individual signals to said remote computer, wherein said remote computer utilizes additional information specific to said electronic control assembly and said received plurality of individual signals to identify components of said electronic control assembly which are not operating within predetermined specifications; and returning to said local computer a list of said identified components not operating within predetermined specifications and said prioritized list of corrective measures.

26. The method of claim 24 further including:

transferring additional information specific to said electronic control assembly to said local computer; and utilizing in said local computer, said additional information and said plurality of individual signals, to identify said components of said electronic control assembly not operating within predetermined specifications, and to generate said prioritized list of corrective measures.

27. A method for diagnosing multiple components of an electrical control assembly, the assembly comprising an electronic control module and a plurality of electrical components electrically connected to the electronic control module by a wiring harness, comprising the steps of:

connecting an interface module between the electronic control assembly and a local computer, the interface module configured to receive electronic signals from said control module and said electrical components;

establishing a data transfer connection between said local computer and a remote computer;

sending from the local computer via said data transfer connection to said remote computer, an identification code identifying the electronic control assembly undergoing diagnosis;

sending from the remote computer via said data transfer connection to the local computer information specific to the electronic control assembly;

operating the electronic control assembly undergoing diagnosis, said interface module receiving a plurality of individual signals from said electronic control assembly and transmitting said signals via said data transfer connection, through said local computer to said remote computer;

interpreting said plurality of individual signals at said remote computer; and receiving at said local computer data via said data transfer connection from said remote computer responsive to said received plurality of individual signals, said data including a prioritized listing of electronic components which are not operating within predetermined specifications.

28. The method of claim 27 wherein said data transfer connection is established as a serial data connection.

29. The method of claim 27 wherein said data connection is established over a telephone line.

30. The method of claim 27 wherein said data connection is established over a data network.

31. The method of claim 27 wherein said data connection is established over a dedicated Internet connection.

* * * * *